United States Patent
Gao et al.

(10) Patent No.: US 10,341,817 B2
(45) Date of Patent: Jul. 2, 2019

(54) POSITIONING METHOD AND APPARATUS BASED ON ELECTRONIC DEVICE OR APPLICATION

(71) Applicant: Baidu Online Network Technology (Beijing) Co., Ltd., Beijing (CN)

(72) Inventors: Xiaoping Gao, Beijing (CN); Yanfeng Zhu, Beijing (CN); Zongyao Ding, Beijing (CN); Haorui Li, Beijing (CN); Jiayi Yang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 15/301,360

(22) PCT Filed: Jul. 14, 2015

(86) PCT No.: PCT/CN2015/083965
§ 371 (c)(1),
(2) Date: Sep. 30, 2016

(87) PCT Pub. No.: WO2016/155146
PCT Pub. Date: Oct. 6, 2016

(65) Prior Publication Data
US 2017/0188200 A1 Jun. 29, 2017

(30) Foreign Application Priority Data
Mar. 31, 2015 (CN) .......................... 2015 1 0150537

(51) Int. Cl.
*H04W 4/029* (2018.01)
*H04W 64/00* (2009.01)
*H04W 8/26* (2009.01)

(52) U.S. Cl.
CPC ............. *H04W 4/029* (2018.02); *H04W 8/26* (2013.01); *H04W 64/003* (2013.01)

(58) Field of Classification Search
CPC ....... H04W 4/008; H04W 4/02; H04W 4/021; H04W 4/025; H04W 4/028; H04W 12/00
(Continued)

(56) References Cited

U.S. PATENT DOCUMENTS 9,262,596 B1 * 2/2016 Steiner .................... G06F 21/10
2008/0227465 A1 9/2008 Wachter et al.
(Continued)

FOREIGN PATENT DOCUMENTS

CN 102801590 A 11/2012
CN 103491625 A 1/2014
(Continued)

OTHER PUBLICATIONS

Korean Intellectual Property Office, Office Action, dated Mar. 27, 2019.

*Primary Examiner* — Jean A Gelin
(74) *Attorney, Agent, or Firm* — Ice Miller LLP

(57) ABSTRACT

A positioning method and apparatus based on an electronic device or application are disclosed. A particular embodiment of the method comprises: receiving a positioning request from an unpositionable electronic device or application, the positioning request comprising a timestamp acquiring location information of a positionable electronic device or application having a network identification identical to a network identification of the unpositionable electronic device or application, and a timestamp corresponding to the location information; and estimating location information of the unpositionable electronic device or application at a time corresponding to the timestamp of the positioning request, based on the location information of the positionable electronic device or application, the timestamp corresponding to the location information, and the timestamp of the positioning request. According to this embodiment, a high-accuracy positioning for an unpositionable electronic device or appli- (Continued)

cation is achieved. Thus, a content pushing or a pushing for an ordered search result based on location information can be customized and optimized, for an unpositionable electronic device or application with an accurate location, and the user may obtain more precise pushing information.

11 Claims, 5 Drawing Sheets

(58) Field of Classification Search
USPC .......... 455/404.2, 405, 406, 410, 411, 414.1, 455/419, 420, 422.1, 456.1, 456.2, 456.3, 455/456.5, 456.6
See application file for complete search history.

(56) References Cited

U.S. PATENT DOCUMENTS

| | | |
|---|---|---|
| 2010/0109943 A1 | 5/2010 | Park et al. |
| 2011/0159862 A1 | 6/2011 | Jackson |
| 2012/0306690 A1 | 12/2012 | Yule et al. |
| 2014/0032346 A1* | 1/2014 | Hong .................... G06Q 20/20 705/18 |
| 2014/0094195 A1 | 4/2014 | Luo et al. |
| 2014/0344895 A1* | 11/2014 | Jimenez Arreola ..... H04L 63/08 726/4 |

FOREIGN PATENT DOCUMENTS

| | | |
|---|---|---|
| JP | 2014153087 A | 8/2014 |
| KR | 100776982 B1 | 11/2007 |
| WO | 2013116015 A1 | 8/2013 |

* cited by examiner

POSITIONING METHOD AND APPARATUS BASED ON ELECTRONIC DEVICE OR APPLICATION

CROSS-REFERENCE TO RELATED APPLICATIONS

The present application is a U.S. national stage of, and claims the priority benefit of, International Patent Application Serial No. PCT/CN2015/083965, filed Jul. 14, 2015 and Chinese Patent Application Serial No. 20150150537.0, filed Mar. 31, 2015, the text and drawings of which are hereby incorporated by reference in their entireties.

TECHNICAL FIELD

The present application relates to the field of computer network technology, in particular, to the field of computer network positioning technology, and more particularly, to a positioning method and apparatus based on an electronic device or application.

BACKGROUND

An accurate positioning of a mobile apparatus is a prerequisite for mobile applications and displaying advertisement.

Currently, due to restrictions on the positioning module or the permission for positioning in the electronic device, only some of the apparatuses or applications (APP) can obtain the location information of the electronic device. The remaining apparatuses and APPs are not able to get the location information of the electronic device, thus a content push or ordered search result push on the basis of location information cannot be individually optimized using the relatively accurate location of the electronic device. As a result, the content push or the ordered search result push a user obtains is rather imprecise.

SUMMARY

An object of the present application is to provide a positioning method and apparatus based on an electronic device or application, so as to solve the technical problems mentioned in the Background.

In a first aspect, the present application provides a positioning method based on an electronic device or application, comprising: receiving a positioning request from an unpositionable electronic device or application, the positioning request comprising a timestamp acquiring location information of a positionable electronic device or application having a network identification identical to a network identification of the unpositionable electronic device or application, and a timestamp corresponding to the location information; and estimating location information of the unpositionable electronic device or application at a time corresponding to the timestamp of the positioning request, based on the location information of the positionable electronic device or application, the timestamp corresponding to the location information, and the timestamp of the positioning request.

In a second aspect, the present application provides a positioning apparatus based on an electronic device or application, comprising: a receiving module, configured to receive a positioning request from an unpositionable electronic device or application, the positioning request comprising a timestamp; an acquiring module, configured to acquire location information of a positionable electronic device or application having a network identification identical to a network identification of the unpositionable electronic device or application, and a timestamp corresponding to the location information; and an estimation module, configured to estimate location information of the unpositionable electronic device or application at a time corresponding to the timestamp of the positioning request, based on the location information of the positionable electronic device or application, the timestamp corresponding to the location information, and the timestamp of the positioning request.

According to the positioning method and apparatus based on an electronic device or application provided in the present application, a positioning request from an unpositionable electronic device or application is received, the positioning request comprising a timestamp; location information of a positionable electronic device or application having a network identification identical to a network identification of the unpositionable electronic device or application, and a timestamp corresponding to the location information are acquired; and location information of the unpositionable electronic device or application at a time corresponding to the timestamp of the positioning request is estimated, based on the location information of the positionable electronic device or application, the timestamp corresponding to the location information, and the timestamp of the positioning request. As a result, a high-accuracy positioning for an unpositionable electronic device or application is achieved. Thus, a content pushing or a pushing for an ordered search result based on location information can be customized and optimized, for an unpositionable electronic device or application with an accurate location, and the user may obtain more precise pushing information.

BRIEF DESCRIPTION OF THE DRAWINGS

After reading detailed descriptions of non-limiting embodiments with reference to the following accompanying drawings, other features, objectives and advantages of the present application will be more apparent.

DETAILED DESCRIPTION OF EMBODIMENTS

The present application is further described in detail through the accompanying drawing and the embodiment. It should be understood that, the specific embodiments described herein are merely used to explain the relevant invention, and are not intended to limit the present invention. In addition, it should be further noted that, in order to facilitate the description, merely the parts related to the relevant invention are shown in the accompanying drawings.

It should be noted that, the embodiments of the present application and features in the embodiments may be combined on a non-conflict basis. The present application will be described in detail through the accompanying drawings and the embodiments.

Figure 1:
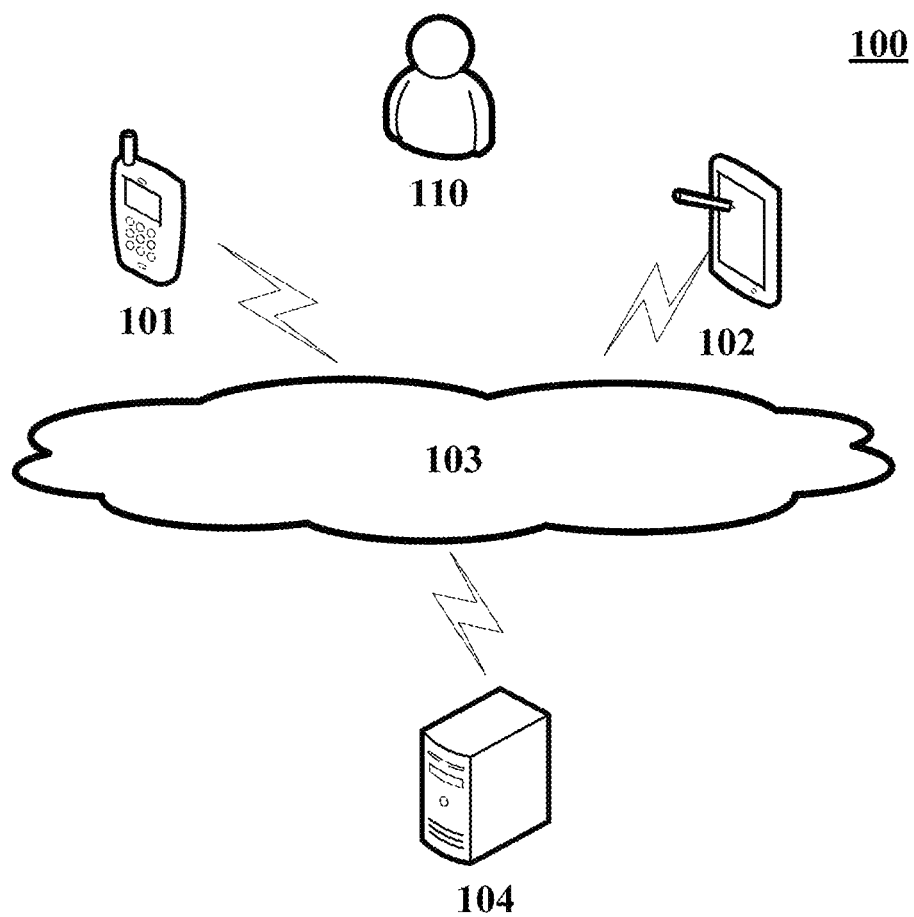
FIG. 1 illustrates an exemplary system architecture to which an embodiment of the present application can be applied.

FIG. 1 illustrates an exemplary system architecture to which an embodiment of the present application can be applied.

As shown in FIG. 1, the system architecture 100 may comprise electronic devices 101 and 102, a network 103 and a server 104. The network 103 is configured to provide a medium for communication links between the electronic devices 101 and 102 and the server 104. The network 103 may be in various connection types, such as wired or wireless communication links and optical fiber cables.

A user 110 may interact with the server 104 by using the electronic devices 101 and 102 via the network 103, so as to receive or transmit messages and the like. There may be various applications installed on the electronic devices 101 and 102, such as a social networking application, a navigation application, a lifestyle application, a weather forecast application, and a medical application.

The electronic devices 101 and 102 may be various electronic devices including a personal computer, a smart phone, a smart watch, a tablet computer, and a personal digital assistant, but not limited thereto.

The server 104 may be a server which provides various services. The server may process, for example, store or analyze, the received data, and then feedback a result of the processing to the electronic device.

It should be noted that the positioning method based on an electronic device or application provided in an embodiment of the present application may be executed by the server 104, or by the electronic device 101 or 102 having the capability of acquiring and processing data, and the positioning apparatus may be provided in the electronic device 101 or 102, or in the server 104.

It should be appreciated that the numbers of the electronic devices, the network and the server in FIG. 1 are merely illustrative. Following practical requirements, any numbers of the electronic devices, the network and the server may be provided.

Figure 2:
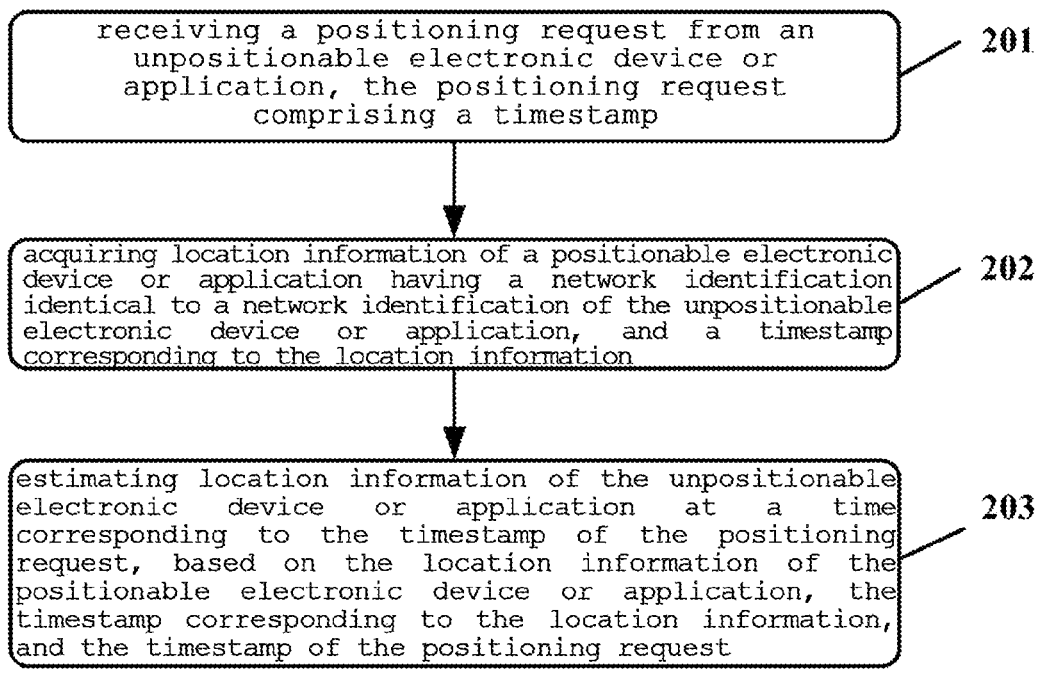
FIG. 2 illustrates a schematic flowchart of a positioning method based on an electronic device or application according to an embodiment of the present application.

FIG. 2 illustrates a schematic flowchart of a positioning method based on an electronic device or application according to an embodiment of the present application.

As shown in FIG. 2, the positioning method 200 based on an electronic device or application comprises the following steps.

Step S201: receiving a positioning request from an unpositionable electronic device or application, the positioning request comprising a timestamp.

The unpositionable electronic device or application may comprise an electronic device without a positioning module, or with a disabled positioning module. The positioning module may comprise but not limited to: a positioning module of Global Position System (GPS), a positioning module of Assisted Global Positioning System (ALPS), a positioning module of Beidou Satellite Navigation System, and a positioning module of a communication base station.

The unpositionable application refers to an application (APP) or a webpage (web) service of an electronic device, which is not authorized for obtaining the location by an operating system or a browser. Thus, such an APP or web service can not accurately acquire the current location of the electronic device or application.

The positioning request may be a message requesting to position the current location, which is sent from the aforementioned unpositionable electronic device or application to a server. The content may comprise but not limited to: a timestamp for requesting the positioning, an IP address or a routing address of the electronic device or application.

The unpositionable electronic device or application may send a positioning request in various circumstances, such as sending a positioning request to a server to determine location information of the device or application itself in order to navigate or use a taxi application; sending a positioning request to find people nearby when using a social application; sending a positioning request when shopping on an online store application or group-buying application; or sending a positioning request to find foods, hotels or entertainment places nearby, for obtaining a recommendation related to the current location.

Step S202: acquiring location information of a positionable electronic device or application having a network identification identical to a network identification of the unpositionable electronic device or application, and a timestamp corresponding to the location information.

The positionable electronic device or application may comprise an electronic device having an enabled positioning module. The positioning module may comprise but not limited to: a positioning module of Global Position System (GPS), a positioning module of Assisted Global Positioning System (ALPS), a positioning module of Beidou Satellite Navigation System, and a positioning module of a communication base station.

The positionable application refers to an APP or a web service of an electronic device, which is authorized for obtaining the location by an operating system or a browser. Thus, such an APP or web service can accurately acquire the current location of the electronic device or application.

The identical network identification may comprise but not limited to an identical network IP address or an identical routing identification ID.

With regard to the location information of the positionable electronic device or application and the timestamp corresponding to the location information, the positionable electronic device or application may upload a plurality pieces of positioning information periodically to a server, and the server stores these pieces of positioning information, such as a historical or a real-time location, a timestamp corresponding to the location, an IP address or a routing address, or the like.

The positionable electronic device or application may upload the positioning information to the server in various circumstances, for example, a navigation or a taxi application uploads positioning information to a server to position its own location; a social application uploads positioning information to find people nearby or to share its location; an online store application or group-buying application uploads positioning information to determine the delivery and service address when a user is shopping; or a general service application uploads positioning information to find foods, hotels or entertainment places nearby.

Step S203: estimating location information of the unpositionable electronic device or application at a time corresponding to the timestamp of the positioning request, based on the location information of the positionable electronic device or application, the timestamp corresponding to the location information, and the timestamp of the positioning request.

Here, the location information of the unpositionable electronic device or application at a time corresponding to the timestamp of the positioning request may be estimated by using an interpolation algorithm or curve fitting algorithm, based on the location information of the positionable electronic device or application, the timestamp corresponding to the location information, and the timestamp of the positioning request.

In a particular implementation scenario, the location information of the unpositionable electronic device at a time corresponding to the timestamp of the positioning request may be estimated, based on the location information of the positionable electronic device, the timestamp corresponding to the location information, and the timestamp of the positioning request sent from the unpositionable electronic device.

In another particular implementation scenario, the location information of the unpositionable electronic application at a time corresponding to the timestamp of the positioning request may be estimated, based on the location information of the positionable electronic device, the timestamp corresponding to the location information, and the timestamp of the positioning request sent from the unpositionable electronic application. Here, the unpositionable application may be installed on a positionable electronic device or on another electronic device having a network identification identical to the network identification of an electronic device on which a positionable application is installed.

In yet another particular implementation scenario, the location information of the unpositionable electronic device at a time corresponding to the timestamp of the positioning request may be estimated, based on the location information of the positionable electronic application, the timestamp corresponding to the location information, and the timestamp of the positioning request sent from the unpositionable electronic device.

In still another particular implementation scenario, the location information of the unpositionable electronic application at a time corresponding to the timestamp of the positioning request may be estimated, based on the location information of the positionable electronic application, the timestamp corresponding to the location information, and the timestamp of the positioning request sent from the unpositionable electronic application. Here, the unpositionable application may be installed on a positionable electronic device or on another electronic device having a network identification identical to the network identification of an electronic device on which a positionable application is installed.

According to the positioning method based on an electronic device or application provided in the aforementioned embodiments of the present application, a high-accuracy positioning for an unpositionable electronic device or application is achieved. Thus, a content pushing or a pushing for an ordered search result based on location information can be customized and optimized, for an unpositionable electronic device or application with an accurate location, and the user may obtain more precise pushing information.

A process of estimating location information of an unpositionable electronic device or application by adopting an interpolation algorithm will be described with reference to FIG. 3.

Figure 3:
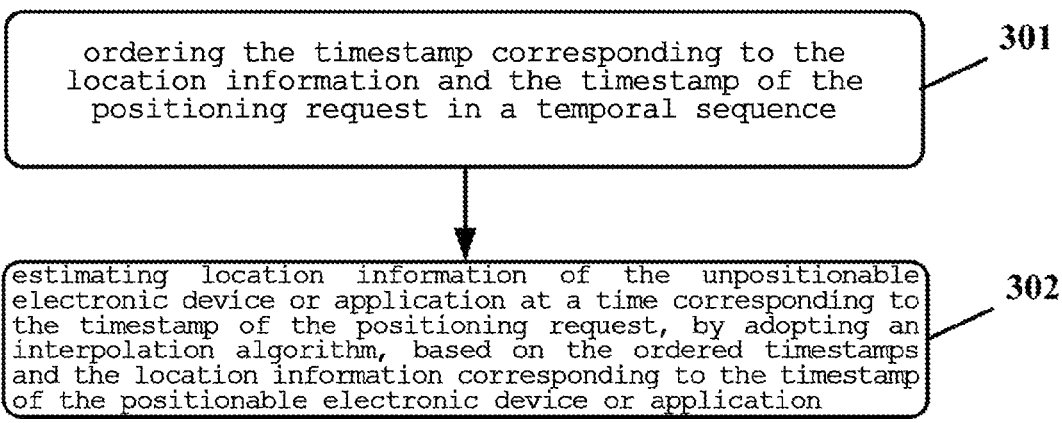
FIG. 3 illustrates a schematic flowchart of a process of estimating location information of an unpositionable electronic device or application by adopting an interpolation algorithm.

FIG. 3 illustrates a schematic flowchart of a process of estimating location information of an unpositionable electronic device or application by adopting an interpolation algorithm, that is, a specific implementation of the step S203 in FIG. 2.

As shown in FIG. 3, the timestamp corresponding to the location information and the timestamp of the positioning request are ordered in a temporal sequence in step S301, and subsequently, location information of the unpositionable electronic device or application at a time corresponding to the timestamp of the positioning request is estimated, by adopting an interpolation algorithm, based on the ordered timestamps and the location information corresponding to the timestamp of the positionable electronic device or application in step S302.

In the step of estimating the location information of the unpositionable electronic device or application by adopting an interpolation algorithm, the discrete data of timestamps of a positionable electronic device during the time period t1-t2 and the corresponding location information can be interpolated with a continuous function, such that a continuous curve passes all of the given discrete data points. Thus, the location information at a time corresponding to the timestamp of the positioning request of the unpositionable electronic device in the time period of t1-t2 can be estimated.

The aforementioned interpolation algorithm may comprise but not limited to an inverse distance weighting interpolation, an average weighting interpolation, a bilinear interpolation, a nearest neighbor interpolation, a spline function interpolation and a cubic convolution interpolation.

With the nearest neighbor interpolation and the inverse distance weighting interpolation as examples, the process of estimating the location information of the unpositionable electronic device or application at a time corresponding to the timestamp of the positioning request by adopting an interpolation algorithm will be explained below.

Assuming $(x_k,y_k,t_k)$ is a point whose location is to be estimated, and $x_k,y_k$) refers to the coordinate to be estimated at the time of $t_k$. $(x_{k-1},y_{k-1},t_{k-1})$ and $(x_{k+1},y_{k+1},t_{k+1})$ are the historical records having successful positioning information before and after the time of $t_k$, $t_{k-1}$ and $t_{k+1}$ are the times of positioning, and $(x_{k-1},y_{k-1})$ and $(x_{k+1},y_{k+1})$ are the coordinates positioned at the corresponding times. Similarly, $(x_{k-i},y_{k-i},t_{k-i})$ and $(x_{k+i},y_{k+i},t_{k+i})$ are the previous $i^{th}$ and the subsequent $i^{th}$ successful positioning records before and after $t_k$.

As the simplest interpolation algorithm for estimating the position, the step of estimating the location information of the unpositionable electronic device or application at a time corresponding to the timestamp of the positioning request by adopting the nearest neighbor interpolation comprises: using the location of a successful positioning closest to the time $t_k$ as the estimation of the location at the time of $t_k$, wherein the formula thereof are as below.

$$(x_k, y_k) = \begin{cases} (x_{k-1}, y_{k-1}) & \text{if } t_k - t_{k-1} \leq t_{k+1} - t_k \\ (x_{k+1}, y_{k+1}) & \text{if } t_k - t_{k-1} \leq t_{k+1} - t_k \end{cases}.$$

The step of estimating the location information of the unpositionable electronic device or application at a time corresponding to the timestamp of the positioning request by adopting the inverse distance weighting interpolation comprises: estimating the location at the intermediate time of $t_k$, based on a number of successfully positioned locations before and after the time of $t_k$, wherein the formula thereof are as below.

$$(x_k,y_k)=\Sigma_{i=1}^{i=n_1}\lambda_{k-i}(x_{k-i},y_{k-i})+\Sigma_{i=1}^{i=n_2}\lambda_{k+i}(x_{k+i},y_{k+i})$$

wherein $\Sigma_{i=1}^{i=n_1}\lambda_{k-i}+\Sigma_{i=1}^{i=n_2}\lambda_{k+i}=1$, $n_1$, $n_2$ represent $n_1$ points taken before the time of $t_k$ and $n_2$ points taken after the time of $t_k$, respectively, and $\lambda_{k\pm i}$ represents the weights for the different positioning points, where the smaller interval between the time of a taken point and the time $t_k$, the bigger weight. Hence, the formula for calculating the weight can be defined as below:

$$\lambda_i = \frac{\phi(d(t_i, t_k))}{\sum_i \phi(d(t_i, t_k))}$$

Since $\phi(d) \to 1$ when $d \to 0$, $\phi(d)$ should be a reciprocal, or a negative exponent, such as $d^{-\gamma}$, $e^{-d}$, $e^{-d^2}$ or the like.

A person skilled in the art should understand that the interpolation algorithm in the embodiments of the present application could be any algorithm for estimating an intermediate positioning point based on one or more sets of positioning points in the prior art or in the future technology, is not limited to the above-mentioned algorithms, and thus the detailed description thereof will be omitted.

According to the process of estimating location information of the unpositionable electronic device or application by adopting an interpolation algorithm of the aforementioned embodiment of the present application, location information of the unpositionable electronic device or application at a time corresponding to the timestamp of the positioning request is estimated by adopting an interpolation algorithm, based on the ordered timestamps and the location information corresponding to the timestamp of the positionable electronic device or application. Therefore, a high-accuracy positioning can be achieved for the unpositionable electronic device or application with a high efficiency.

Next, a process of estimating location information of an unpositionable electronic device or application by adopting a curve-fitting algorithm will be described.

During the process of estimating location information of an unpositionable electronic device or application by adopting a curve-fitting algorithm, an x coordinate fitting curve and a y coordinate fitting curve associated with the location information of a positionable electronic device or application in the time period of t1-t2 can be fitted, respectively. When a timestamp of a positioning request falls into the time period of t1-t2, an x coordinate and a y coordinate associated with the location information of the unpositionable electronic device at the time corresponding to the timestamp of the positioning request can be located by using the aforementioned x coordinate fitting curve and y coordinate fitting curve. As a result, the location information at the time corresponding to the timestamp of the positioning request can be obtained.

According to the process of estimating the location information of the unpositionable electronic device or application by adopting a curve-fitting algorithm of the aforementioned embodiment of the present application, a high-accuracy positioning is achieved for the unpositionable electronic device or application.

Figure 4:
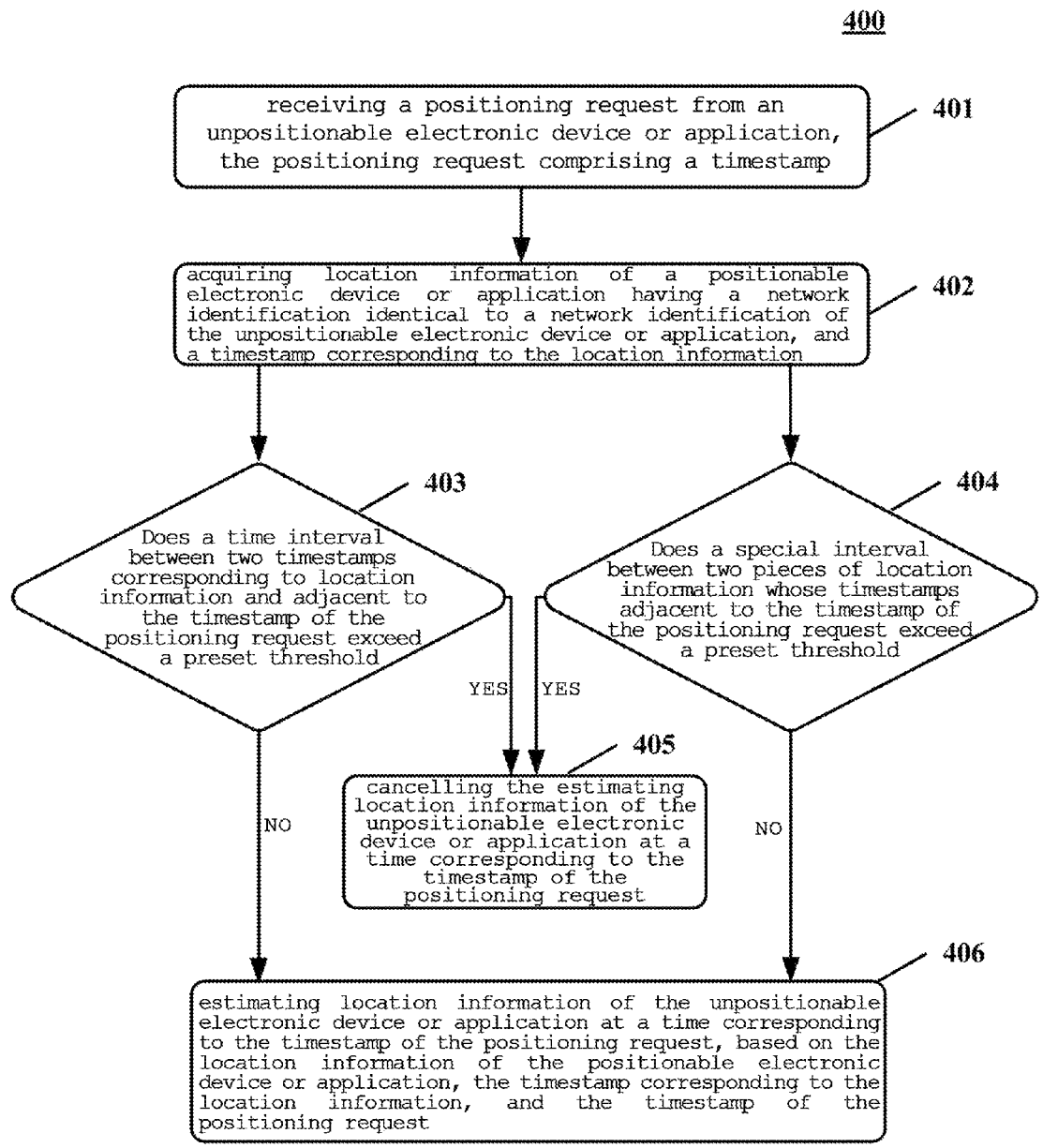
FIG. 4 illustrates another schematic flowchart of a positioning method based on an electronic device or application according to an embodiment of the present application.

FIG. 4 illustrates another schematic flowchart of a positioning method based on an electronic device or application according to an embodiment of the present application.

As shown in FIG. 4, the positioning method 400 based on an electronic device or application comprises the following steps.

Step S401: receiving a positioning request from an unpositionable electronic device or application, the positioning request comprising a timestamp.

Step S402: acquiring location information of a positionable electronic device or application having a network identification identical to a network identification of the unpositionable electronic device or application, and a timestamp corresponding to the location information.

Step S403: determining whether a time interval between two timestamps corresponding to location information and adjacent to the timestamp of the positioning request exceeds a preset threshold; if yes, proceeding to step S405, and if no, proceeding to step S406.

Step S404: determining whether a special interval between two pieces of location information whose timestamps adjacent to the timestamp of the positioning request exceeds a preset threshold; if yes, proceeding to step S405; and if no, proceeding to step S406.

Step S405: cancelling the estimating location information of the unpositionable electronic device or application at a time corresponding to the timestamp of the positioning request.

Step S406: estimating location information of the unpositionable electronic device or application at a time corresponding to the timestamp of the positioning request, based on the location information of the positionable electronic device or application, the timestamp corresponding to the location information, and the timestamp of the positioning request.

In this embodiment, step S401, step S402 and step S406 of the above implementation process are the same as step S201, step S202 and step S203 of the aforementioned embodiment, respectively, and thus the detailed description thereof will be omitted.

With step S403 and step S405, the known location information is filtered in a temporal dimension, to avoid impacting the positional estimation accuracy with the use of location information far away. That is, if a time interval between two timestamps corresponding to location information and adjacent to the timestamp of the positioning request exceeds a preset threshold, it will cancel estimating location information of the unpositionable electronic device or application at a time corresponding to the timestamp of the positioning request. For example, in this embodiment, if the time interval between $t_k$ and $t_{k-1}$ exceeds a certain threshold, the positioning result right before $t_k$ and the previous positioning results before $t_k$ are considered to be invalid for estimating the location at the time of $t_k$. Similarly, if the time interval between $t_k$ and $t_{k+1}$ exceeds a certain threshold, the positioning result right after t and the subsequent positioning results after $t_k$ are considered to be invalid for estimating the location at the time of $t_k$.

Alternatively or additionally, with step S404 and step S405, the known location information is filtered in a spatial dimension, to avoid impacting the positional estimation accuracy with the use of two positioned locations having a long drift therebetween. That is, if a special interval between two pieces of location information whose timestamps adjacent to the timestamp of the positioning request exceeds a preset threshold, it will cancel estimating location information of the unpositionable electronic device or application at a time corresponding to the timestamp of the positioning request. For example, in this embodiment, if the distance between two successfully positioned locations $(x_{k-1}, y_{k-1})$ and $(x_{k+1}, y_{k+1})$ exceeds a certain threshold, it is means that a long drift exists between these two positioned locations. As a result, a location between these two positioned locations cannot be estimated. As another example, in the case that an inverse distance weighting interpolation is adopted to estimate the location in this embodiment, if the distance between two neighboring points $(x_{k-i}, y_{k-i})$ and $(x_{k-i+1}, y_{k-i+1})$ in the formula exceeds a certain threshold, the point $(x_{k-i}, y_{k-i})$ which is far from the to-be-estimated time $t_k$ and the farther locations before that point are discarded. The positioning points which are far from and after the time $t_k$ are processed in the same manner. The more stable positioned points with short drifts are reserved as the sampling points for the positional interpolation.

According to the positioning method based on an electronic device or application of the above embodiment of the present application, the known location information is filtered both in the temporal and the spatial dimensions, such that the accuracy of estimating the location information of the unpositionable electronic device or application is further increased.

Figure 5:
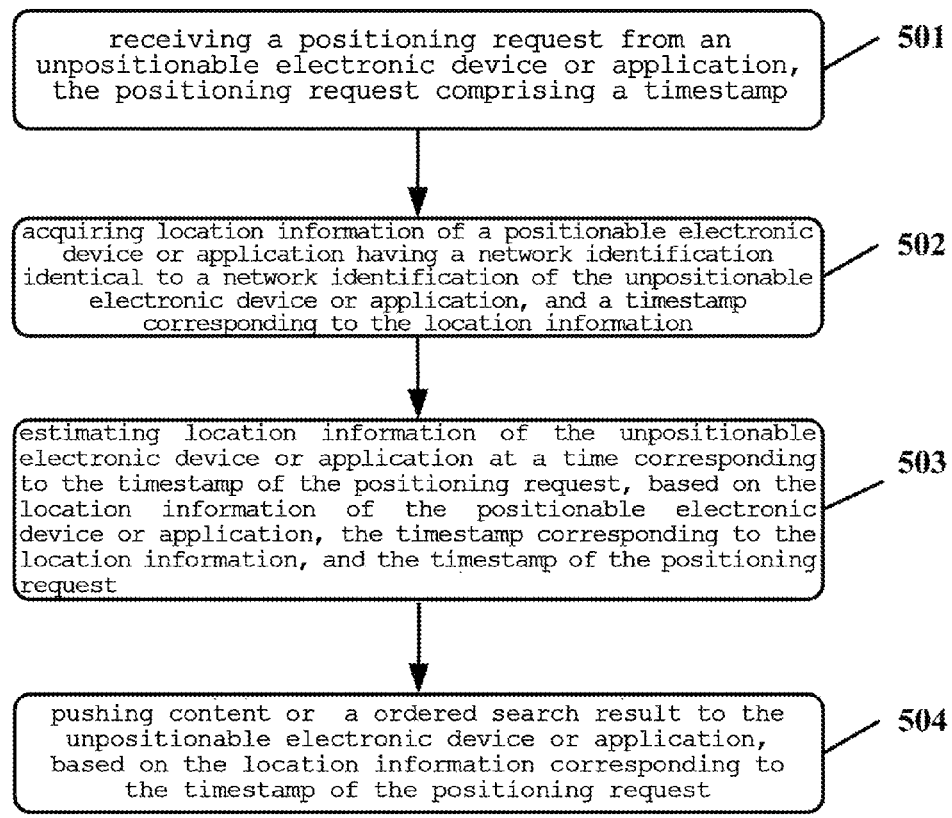
FIG. 5 illustrates a third schematic flowchart of a positioning method based on an electronic device or application according to an embodiment of the present application.

FIG. 5 illustrates a third schematic flowchart of a positioning method based on an electronic device or application according to an embodiment of the present application.

As shown in FIG. 5, the positioning method 500 based on an electronic device or application comprises the following steps.

Step S501: receiving a positioning request from an unpositionable electronic device or application, the positioning request comprising a timestamp.

Step S502: acquiring location information of a positionable electronic device or application having a network identification identical to a network identification of the unpositionable electronic device or application, and a timestamp corresponding to the location information.

Step S503: estimating location information of the unpositionable electronic device or application at a time corresponding to the timestamp of the positioning request, based on the location information of the positionable electronic device or application, the timestamp corresponding to the location information, and the timestamp of the positioning request.

Step S504: pushing content or a ordered search result to the unpositionable electronic device or application, based on the location information corresponding to the timestamp of the positioning request.

In this embodiment, step S501, step S502 and step S503 of the above implementation process are the same as step S201, step S202 and step S203 of the aforementioned embodiment, respectively, and thus the detailed description thereof will be omitted.

According to the positioning method based on an electronic device or application of the above embodiment of the present application, the customization and optimization for an unpositionable electronic device or application with an accurate location can be achieved, and the user may obtain more precise pushing information.

Figure 6:
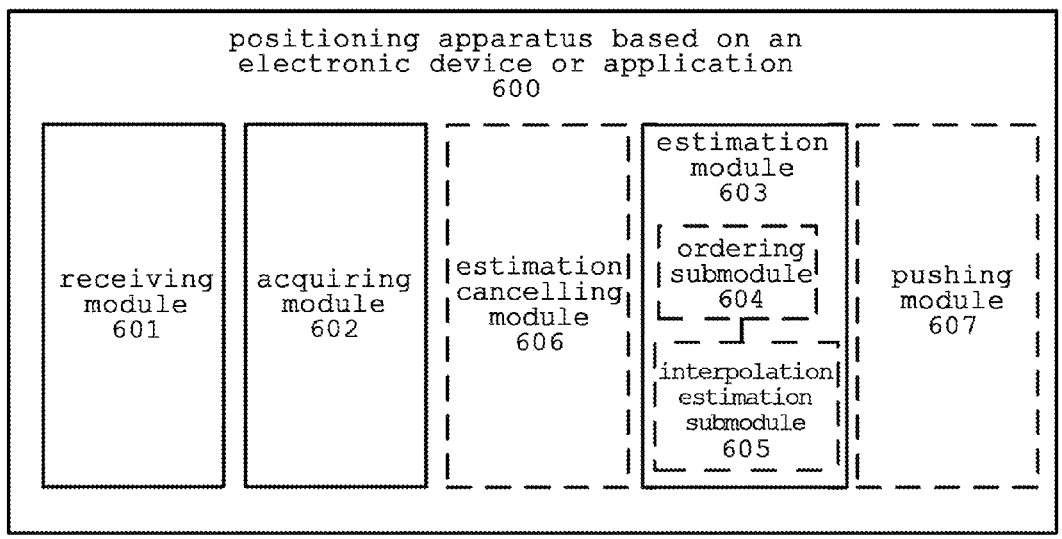
FIG. 6 illustrates a schematic structural diagram of a positioning apparatus based on an electronic device or application according to an embodiment of the present application.

FIG. 6 illustrates a schematic structural diagram of a positioning apparatus based on an electronic device or application according to an embodiment of the present application.

As shown in FIG. 6, the positioning apparatus 600 based on an electronic device or application comprises a receiving module 601, an acquiring module 602, and an estimation module 603.

The receiving module 601 is configured to receive a positioning request from an unpositionable electronic device or application, the positioning request comprising a timestamp.

The acquiring module 602 is configured to acquire location information of a positionable electronic device or application having a network identification identical to a network identification of the unpositionable electronic device or application, and a timestamp corresponding to the location information.

The estimation module 603 is configured to estimate location information of the unpositionable electronic device or application at a time corresponding to the timestamp of the positioning request, based on the location information of the positionable electronic device or application, the timestamp corresponding to the location information, and the timestamp of the positioning request.

The identical network identification comprises an identical network IP address or an identical routing identification ID.

In some embodiments, the estimation module 603 may comprise a ordering submodule 604 for ordering the timestamp corresponding to the location information and the timestamp of the positioning request in a temporal sequence, and an interpolation estimation submodule 605 for estimating location information of the unpositionable electronic device or application at a time corresponding to the timestamp of the positioning request, by adopting an interpolation algorithm, based on the ordered timestamps and the location information corresponding to the timestamp of the positionable electronic device or application.

The interpolation algorithm may comprise any one of an inverse distance weighting interpolation, an average weighting interpolation, a bilinear interpolation, a nearest neighbor interpolation, a spline function interpolation and a cubic convolution interpolation, but not limited thereto.

In some embodiments, the apparatus 600 may further comprise an estimation cancelling module 606 configured to: cancel the estimating location information of the unpositionable electronic device or application at a time corresponding to the timestamp of the positioning request, if a time interval between two timestamps corresponding to location information and adjacent to the timestamp of the positioning request exceeds a preset threshold; and/or estimate location information of the unpositionable electronic device or application at a time corresponding to the timestamp of the positioning request, based on the location information of the positionable electronic device or application, the timestamp corresponding to the location information, and the timestamp of the positioning request.

In some embodiments, the apparatus 600 may further comprise a pushing module 607 configured to push content or a ordered search result to the unpositionable electronic device or application, based on the location information corresponding to the timestamp of the positioning request.

It should be appreciated that the units included in the apparatus 600 correspond to the respective steps of the method described with reference to FIGS. 2 to 5. Therefore, the operations and features described along with the positioning method based on an electronic device or application above may also be applicable for the apparatus 600 and the units included therein, and thus the detailed description thereof will be omitted herein. The corresponding units within the apparatus 600 may coordinate with units within an electronic device and/or a server, so as to implement the embodiments of the present application.

According to the positioning apparatus based on an electronic device or application provided in the aforementioned embodiments of the present application, a high-accuracy positioning for an unpositionable electronic device or application is achieved. Thus, a content pushing or a pushing for an ordered search result based on location information can be customized and optimized, for an unpositionable electronic device or application with an accurate location, and the user may obtain more precise pushing information.

Figure 7:
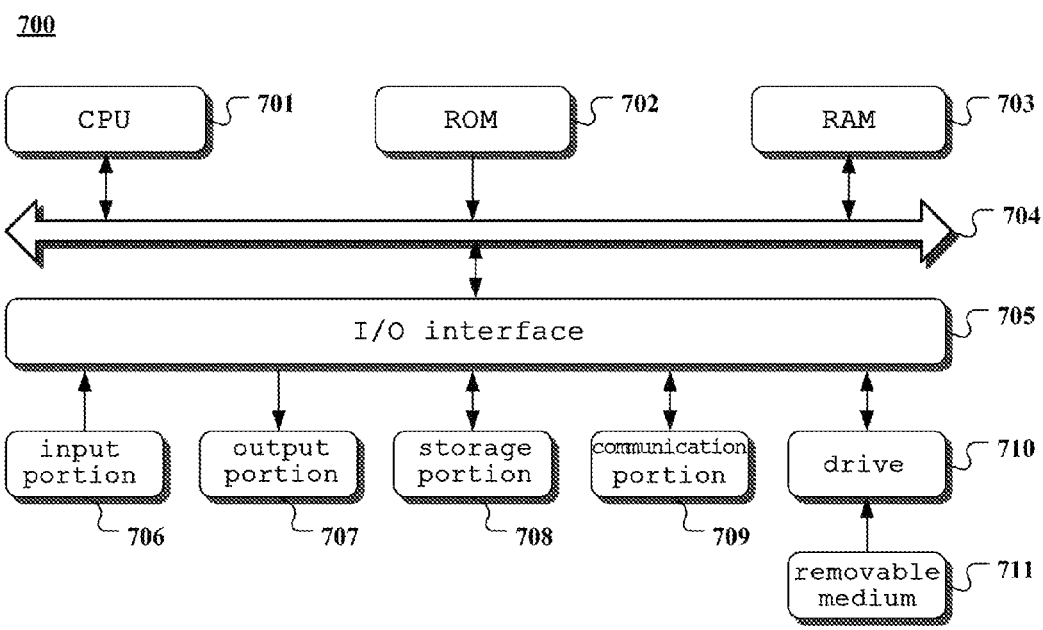
FIG. 7 illustrates a schematic structural diagram of a computer system of an electronic device or a server adapted to implement an embodiment of the present application.

Referring to FIG. 7, a schematic structural diagram of a computer system adapted to implement an electronic apparatus or server of the embodiments of the present application is shown.

As shown in FIG. 7, the computer system X00 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 comprising a cathode ray tube (CRT), a liquid crystal display device (LCD), a speaker etc.; a storage portion 708 including a hard disk and the like; and a communication portion 709 comprising a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to an embodiment of the present disclosure, the process described above with reference to FIG. 2 may be implemented in a computer software program. For example, an embodiment of the present disclosure includes a computer program product, which comprises a computer program that is tangibly embedded in a machine-readable medium. The computer program comprises program codes for executing the method of FIG. 2. In such an embodiment, the computer program may be downloaded and installed from a network via the communication portion 709, and/or may be installed from the removable media 711.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a receiving module, an acquiring module, and an estimation module, where the names of these units or modules are not considered as a limitation to the units or modules. For example, the receiving module may also be described as "a module for receiving a positioning request from an unpositionable electronic device or application, the positioning request comprising a timestamp".

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. The programs are used by one or more processors to execute the positioning method based on an electronic device or application of the present application.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A positioning method based on an electronic device or application, comprising:
   receiving a positioning request from an unpositionable electronic device or application, the positioning request comprising a timestamp;
   acquiring location information of a positionable electronic device or application having a network identification identical to a network identification of the unpositionable electronic device or application, and a timestamp corresponding to the location information; and
   estimating location information of the unpositionable electronic device or application at a time corresponding to the timestamp of the positioning request, based on the location information of the positionable electronic device or application, the timestamp corresponding to the location information, and the timestamp of the positioning request,
   wherein the estimating location information of the unpositional electronic device or application at a time corresponding to the timestamp of the positioning request comprises:
   ordering the timestamp corresponding to the location information and the timestamp of the positioning request in a temporal sequence; and
   estimating location information of the unpositionable electronic device or application at a time corresponding to the timestamp of the positioning request, by adopting an interpolation algorithm, based on the ordered timestamps and the location information corresponding to the timestamp of the positionable electronic device or application.

2. The method according to claim 1, wherein the interpolation algorithm comprises any one of the following algorithms:
   an inverse distance weighting interpolation, an average weighting interpolation, a bilinear interpolation, a nearest neighbor interpolation, a spline function interpolation and a cubic convolution interpolation.

3. The method according to claim 1, wherein the identical network identification comprises an identical network IP address or an identical routing identification ID.

4. The method according to claim 1, further comprising:
cancelling the estimating location information of the unpositionable electronic device or application at a time corresponding to the timestamp of the positioning request, if a time interval between two timestamps corresponding to location information and adjacent to the timestamp of the positioning request exceeds a preset threshold; and/or
cancelling the estimating location information of the unpositionable electronic device or application at a time corresponding to the timestamp of the positioning request, if a special interval between two pieces of location information whose timestamps adjacent to the timestamp of the positioning request exceeds a preset threshold.

5. The method according to claim 1, further comprises:
pushing content or an ordered search result to the unpositionable electronic device or application, based on the location information corresponding to the timestamp of the positioning request.

6. A positioning apparatus based on an electronic device or application, comprising:
one or more processors;
a memory;
one or more programs stored in the memory, and when executed by the one or more processors, causing the one or more processors to perform operations, the operations comprising:
receiving a positioning request from an unpositionable electronic device or application, the positioning request comprising a timestamp;
acquiring location information of a positionable electronic device or application having a network identification identical to a network identification of the unpositionable electronic device or application, and a timestamp corresponding to the location information; and
estimating location information of the unpositionable electronic device or application at a time corresponding to the timestamp of the positioning request, based on the location information of the positionable electronic device or application, the timestamp corresponding to the location information, and the timestamp of the positioning request,
wherein the estimating location information of the unpositionable electronic device or application at a time corresponding to the timestamp of the positioning request comprises:
ordering the timestamp corresponding to the location information and the timestamp of the positioning request in a temporal sequence; and
estimating location information of the unpositionable electronic device or application at a time corresponding to the timestamp of the positioning request, by adopting an interpolation algorithm, based on the ordered timestamps and the location information corresponding to the timestamp of the positionable electronic device or application.

7. The apparatus according to claim 6, wherein the interpolation algorithm comprises any one of the following algorithms:
an inverse distance weighting interpolation, an average weighting interpolation, a bilinear interpolation, a nearest neighbor interpolation, a spline function interpolation and a cubic convolution interpolation.

8. The apparatus according to claim 6, wherein the identical network identification comprises an identical network IP address or an identical routing identification ID.

9. The apparatus according to claim 6, further comprising:
cancelling the estimating location information of the unpositionable electronic device or application at a time corresponding to the timestamp of the positioning request, if a time interval between two timestamps corresponding to location information and adjacent to the timestamp of the positioning request exceeds a preset threshold; and/or
cancelling the estimating location information of the unpositionable electronic device or application at a time corresponding to the timestamp of the positioning request, if a special interval between two pieces of location information whose timestamps adjacent to the timestamp of the positioning request exceeds a preset threshold.

10. The apparatus according to claim 6, further comprises:
pushing content or an ordered search result to the unpositionable electronic device or application, based on the location information corresponding to the timestamp of the positioning request.

11. A non-transitory computer storage medium, storing one or more programs, the one or more programs when executed by an apparatus, causing the apparatus to:
receiving a positioning request from an unpositionable electronic device or application, the positioning request comprising a timestamp perform operations, the operations comprising;
acquiring location information of a positionable electronic device or application having a network identification identical to a network identification of the unpositionable electronic device or application, and a timestamp corresponding to the location information; and
estimating location information of the unpositionable electronic device or application at a time corresponding to the timestamp of the positioning request, based on the location information of the positionable electronic device or application, the timestamp corresponding to the location information, and the timestamp of the positioning request,
wherein the estimating location information of the unpositionable electronic device or application at a time corresponding to the timestamp of the positioning request comprises:
ordering the timestamp corresponding to the location information and the timestamp of the positioning request in a temporal sequence; and
estimating location information of the unpositionable electronic device or application at a time corresponding to the timestamp of the positioning request, by adopting an interpolation algorithm, based on the ordered timestamps and the location information corresponding to the timestamp of the positionable electronic device or application.

* * * * *